United States Patent
Horibata (10) Patent No.: US 7,660,220 B2
(45) Date of Patent: Feb. 9, 2010

(54) OPTICAL DISC DRIVE APPARATUS AND SIGNAL RECORDING METHOD

(75) Inventor: Yoshihiro Horibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 579 days.

(21) Appl. No.: 11/489,637

(22) Filed: Jul. 20, 2006

(65) Prior Publication Data

US 2007/0025206 A1    Feb. 1, 2007

(30) Foreign Application Priority Data

Jul. 27, 2005    (JP) .............................. 2005-216629

(51) Int. Cl.
*G11B 11/00*    (2006.01)
(52) U.S. Cl. .............. 369/53.19; 369/53.26; 369/44.27; 369/47.5
(58) Field of Classification Search .................. None
See application file for complete search history.

(56) References Cited

U.S. PATENT DOCUMENTS

| | | | | |
|---|---|---|---|---|
| 6,664,526 | B2 * | 12/2003 | Yokoi ...................... | 250/201.5 |
| 6,704,269 | B1 | 3/2004 | Ogawa | |
| 2001/0043534 | A1 * | 11/2001 | Gyo ........................ | 369/53.26 |
| 2002/0126605 | A1 | 9/2002 | Lee et al. | |
| 2004/0027949 | A1 * | 2/2004 | Matsuura et al. ......... | 369/47.51 |
| 2004/0145977 | A1 | 7/2004 | Sakai et al. | |
| 2005/0047317 | A1 | 3/2005 | Watanabe et al. | |
| 2005/0219981 | A1 * | 10/2005 | Iimura ...................... | 369/53.26 |
| 2005/0243682 | A1 * | 11/2005 | Chen ........................ | 369/59.25 |

FOREIGN PATENT DOCUMENTS

| | | |
|---|---|---|
| JP | 2000-331364 | 11/2000 |
| JP | 2001-184689 | 7/2001 |
| JP | 2004-22126 | 1/2004 |
| JP | 2004-234703 | 8/2004 |

* cited by examiner

*Primary Examiner*—Tan X Dinh
*Assistant Examiner*—Jesse Hauck
(74) *Attorney, Agent, or Firm*—Oblon, Spivak, McClelland, Maier & Neustadt, L.L.P.

(57) ABSTRACT

An optical disc drive apparatus includes: a laser beam source; a collector device disposed as facing a disc that can record a signal, which collects a laser beam emitted from the laser beam source onto the disc; a record processing module which records the signal on the disc through the collector device while modulating laser power of the laser beam source; a reflecting light level detecting module which receives the reflecting light when the signal is recorded and detects a level of the reflecting light; a laser power control module which controls the laser power when the signal is recorded based on the detected level of the reflecting light; a tilt control module which controls a tilt angle between the disc and the collector device based on the detected level of the reflecting light; and a switching module which switches between control of the laser power and the tilt angle.

5 Claims, 7 Drawing Sheets

OPTICAL DISC DRIVE APPARATUS AND SIGNAL RECORDING METHOD

CROSS REFERENCES TO RELATED APPLICATIONS

The present invention contains subject matter related to Japanese Patent Application JP 2005-216629 filed in the Japanese Patent Office on Jul. 27, 2005, the entire contents of which being incorporated herein by reference.

BACKGROUND OF THE INVENTION

1. Field of the Invention

The present invention relates to an optical disc drive apparatus which can record a signal, and a signal recording method of the same.

2. Description of the Related Art

In recent years, writable optical discs such as CD±R, DVD±R, DVD±RW, and Blu-ray disc are commercially available. In an optical disc apparatus which can meet these optical discs, for example, there is an optical disc apparatus (for example, see Patent Reference 1) which sets a skew target value based on the signal level of an RF playback signal acquired in signal recording to perform skew control (or, it is referred to as tilt control, but hereinafter, it is referred to as tilt because they have the same meanings). However, the RF signal level (the level of a light reflecting from a pit) in the section for detection during recording is varied not only by the change in the tilt angle but also by irregularities in a recording film and temperature change. More specifically, even though the disc is written at the same recording power, the pit is not formed in the same shape because of irregularities in the recording film and temperature change.

In order to solve such problems, under present circumstances, a technique is generally used which is called running OPC (Optimum Power. Control) (hereinafter, it is referred to as ROPC) (for example, see Patent Reference 2). In an ROPC system, the laser recording power is controlled in real time by monitoring the level of a reflecting light so that the level of the reflecting light is made constant. More specifically, for example, suppose a disc is written at a certain level of recording power, or a certain level of multi-pulse power. In the midway of the process, when it is detected that the level of the reflecting light is dropped, which is caused by irregularities in the recording film, for example, the ROPC system performs control so that the recording power is reduced because the pit shape is too deep.

Patent Reference 1: JP-A-2000-331364 (Paragraph [0054] and FIG. 4)

Patent Reference 2: JP-A-2002-288831 (Paragraph [0008])

SUMMARY OF THE INVENTION

However, when tilt control is performed based on the level of the reflecting light in the midway of operation of the ROPC system, the following problems occur. For example, as described above, since the level of the reflecting light is varied because of irregularities in the recording film, the level of a reflecting light having a zero tilt angle is sometimes detected even though the tilt angle is not zero. When such a state continues, the tilt angle may not be converged on zero, and thus tilt control may be impossible. In addition, in this case, the recording power is changed to try to compensate for fluctuations in the tilt angle, and thus the overall recording margin is reduced. Furthermore, when tilt control is performed all the time during recording, recording quality is deteriorated and the loads of the system process time become great.

It is desirable to provide an optical disc drive apparatus and a signal recording method of the same, which can perform a recording process while tilt control is being performed in an appropriate manner even though the level of the reflecting light fluctuates in recording because of some cause such as irregularities in the recording film.

According to an embodiment of the invention, an optical disc drive apparatus includes: a laser beam source; a collector device which is disposed as it faces a disc that can record a signal and which collects a laser beam emitted from the laser beam source onto the disc; a record processing module which records the signal on the disc through the collector device while it is modulating laser power of the laser beam source; a reflecting light level detecting module which receives the reflecting light when the signal is recorded and which detects a level of the reflecting light; a laser power control module which controls the laser power when the signal is recorded based on the detected level of the reflecting light; a tilt control module which controls a tilt angle between the disc and the collector device based on the detected level of the reflecting light; and a switching module which switches between control of the laser power and control of the tilt angle.

In an embodiment of the invention, there is provided the switching module which switches between control of the laser power and control of the tilt angle. Therefore, for example, when laser power control is stopped in tilt control, laser power is made constant. From the viewpoint of performing tilt control, the level of the reflecting light from the disc is detected in an appropriate manner, and recording quality can be prevented from being deteriorated.

For the laser beam, for example, a laser beam having a wavelength of about 650 nm is used. However, it is not limited thereto. A laser beam of green, blue or violet having a wavelength shorter than 650 nm, or a laser beam having a wavelength longer than 650 nm may be used. In addition, lights other than visible lights may be used.

The collector device means an objective lens or an optical system including the objective lens, which may be any elements which can collect a laser beam on a disc.

In an embodiment of the invention, more specifically, the switching module includes: a first acquiring module which acquires a first variation that is a variation in the detected level of the reflecting light; and a first control module which stops control done by the laser power control module and starts control done by the tilt control module when the first variation is equal to or greater than a first threshold. In addition, the switching module includes: a second acquiring module which acquires a second variation that is a variation in the laser power; and a second control module which stops control done by the laser power control module and starts control done by the tilt control module when the first variation is below the threshold and the second variation is equal to or greater than a second threshold. As described above, when the first variation is abnormal, the switching module switches to tilt control without determination whether the second variation is abnormal that is the variation in laser power. Thus, the process is simplified.

The variation is a difference between the level at a certain timing and the level at a certain timing after that. In this case, as described later, it may be a difference between the mean value of levels within a certain predetermined period and the level after the predetermined period. Alternatively, the variation may be the variation in time base, that is, it may be a slope.

In an embodiment of the invention, the first acquiring module includes: a first computing module which computes a mean value of the levels of the reflecting light within a predetermined period; and a second computing module which computes a difference between the computed mean value and the detected level of the reflecting light after the predetermined period as the first variation. Alternatively, the second acquiring module includes: a first computing module which computes a mean value of the laser power within a predetermined period; and a second computing module which computes a difference between the computed mean value and the detected laser power after the predetermined period as the second variation. The predetermined period can be set freely. "To compute a mean value of the levels of the reflecting light within a predetermined period" also includes a meaning that "sampling is made for a predetermined number of times (for example, twice or greater) to compute a mean value".

In an embodiment of the invention, the record processing module can record the signal on the disc at the laser power including a recording level and a playback level that is a level in a playback process of the signal and in a multi-pulse mode; and the tilt control module performs control within a period that the laser power is turned to the playback level by the record processing module. Alternatively, the record processing module can record the signal on the disc at the laser power including a recording level and an erase level that is a level in an erase process of the signal and in a multi-pulse mode; and the tilt control module performs control within a period that the laser power is turned to the erase level by the record processing module. In the multi-pulse mode, in recording by multiple pulses, the level of the reflecting light is unstable. In the space section such as the erase section and the playback section, the level of the reflecting light becomes stable. Thus, the level of the reflecting light is sampled in the space section to detect a stable, appropriate level of the reflecting light more than in recording by multiple pulses.

In an embodiment of the invention, the record processing module includes a determination module which determines whether an erase section length for recording at an erase level is equal to or greater than a threshold; and the tilt control module performs control within an erase section equal to or greater than the threshold when the determination module determines that the erase section length is equal to or greater than the threshold. Alternatively, the record processing module includes a determination module which determines whether a playback level section length for recording at a playback level is equal to or greater than a threshold; and the tilt control module performs control within a playback level section equal to or greater than the threshold when the determination module determines that the playback level section length is equal to or greater than the threshold. There are various space section lengths such as the erase section length and the playback level section length. Therefore, as in an embodiment of the invention, tilt control is performed when the space section length is equal to or greater than the threshold, and thus a stable, appropriate level of the reflecting light is detected. The threshold can be set freely.

In an embodiment of the invention, the record processing module includes a first modifying module which changes recording speed; and the tilt control module has a second modifying module which changes the threshold in response to a factor of recording speed to be changed. When the recording speed is faster, the space section length becomes shorter as well. Therefore, the threshold is changed so that a relatively long space section is selected, and thus a stable, appropriate level of the reflecting light is detected.

A signal recording method according to an embodiment of the invention is a signal recording method including the steps of: collecting a laser beam emitted from a laser beam source through a collector device which is disposed as it faces a disc that can record a signal and recording the signal on the disc while laser power of the laser beam source is being modulated; receiving the reflecting light when the signal is recorded and detecting a level of the reflecting light; controlling the laser power when the signal is recorded based on the detected level of the reflecting light; controlling a tilt angle between the disc and the collector device based on the detected level of the reflecting light; and switching between control of the laser power and control of the tilt angle.

As described above according to an embodiment of the invention, even though the level of the reflecting light fluctuates in recording because of some cause such as irregularities in the recording film, recording can be processed in an appropriate manner while tilt control is being performed.

DETAILED DESCRIPTION OF THE INVENTION

Hereinafter, embodiments of the invention will be described with reference to the drawings.

Figure 1:
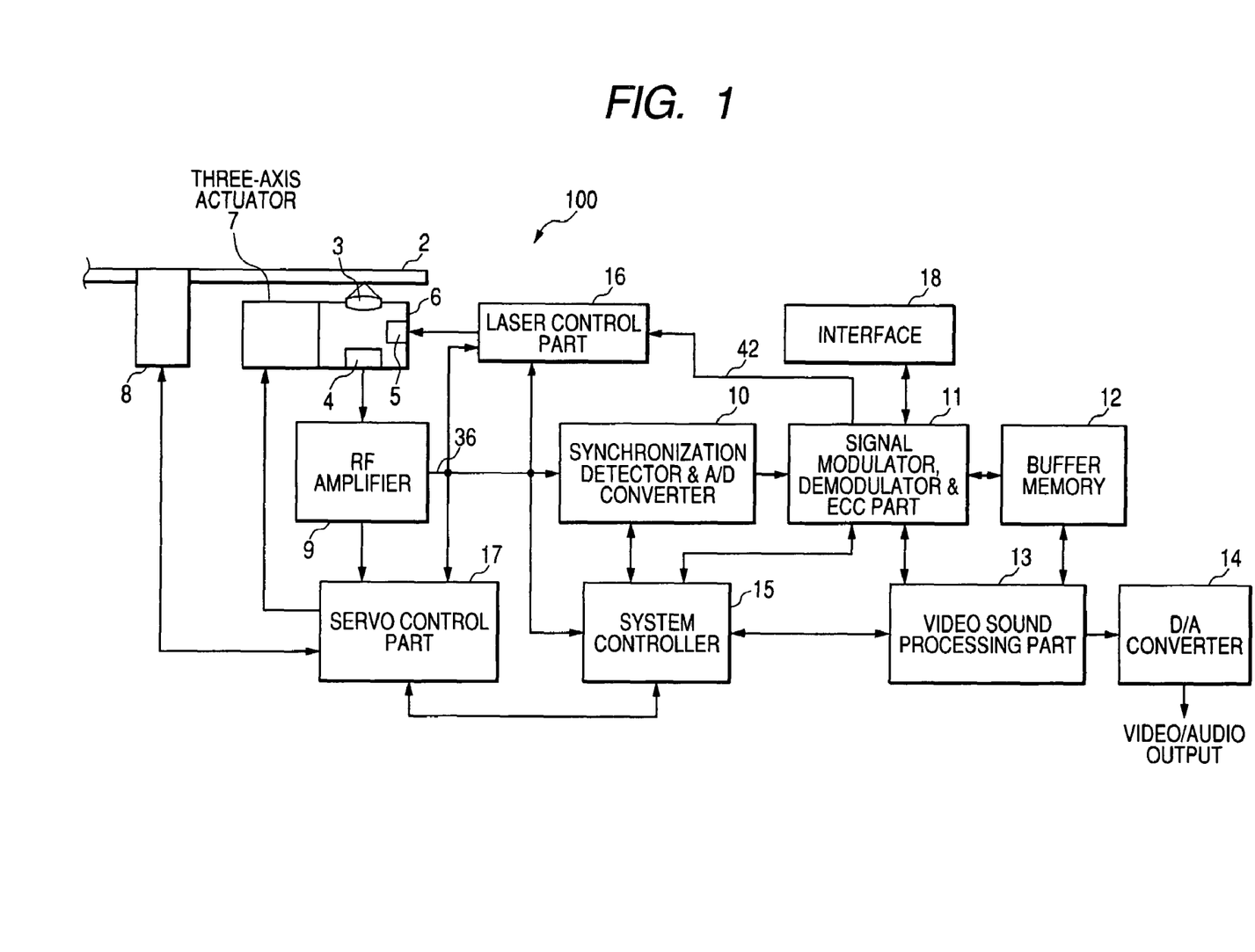
FIG. 1 shows a block diagram depicting the configuration of an optical disc apparatus according to an embodiment of the invention.

FIG. 1 shows a block diagram depicting the configuration of an optical disc apparatus according to an embodiment of the invention.

An optical disc apparatus 100 has a spindle motor 8, an optical pickup 6, an RF amplifier 9, a three-axis actuator 7, and a servo control part 17.

The spindle motor 8 rotates and drives an optical disc 2 such as a DVD±R/RW, a CD-R/RW, and a Blu-ray disc. The optical pickup 6 has a laser beam source 5, an objective lens 3 which collects the laser beam emitted from the laser beam source 5 onto the optical disc 2, a photodetector (PD) 4 which detects a light reflected and returning from the disc 2, and the other elements. For the laser beam source 5, for example, solid laser, particularly to a laser diode (LD) is used, but it is not limited thereto. In addition to this, the optical pickup 6 has an optical system and other elements, not shown, which leads the laser beam emitted from the laser beam source 5 to the objective lens 3. The RF amplifier 9 creates a focus error signal, a tracking error signal, an RF signal and other signals based on various signals outputted from the PD 4 of the optical pickup 6. The three-axis actuator 7 particularly moves the portion of the objective lens 3 of the optical pickup 6 in the tracking direction, the focusing direction and the tilt direction. The servo control part 17 outputs various servo signals to the three-axis actuator 7 and the spindle motor 8 based on the focus error signal, the tracking error signal and the RF signal.

In addition, the optical disc apparatus 100 has a thread motor, not shown, which moves the optical pickup 6 in the radial direction of the disc 2. The servo control part 17 also outputs servo signals to the thread motor.

The optical disc apparatus 100 has a system controller 15, a laser control part 16, a synchronization detector & A/D converter 10, a signal modulator, demodulator & ECC (Error Correction Code) part 11, a buffer memory 12, a video sound processing part 13, a D/A converter 14, and an interface 18.

The system controller 15 receives and outputs various signals to comprehensively control the overall optical disc apparatus 100. The laser control part 16 receives a modulated signal 42 from the signal modulator, demodulator & ECC part 11 to modulate the laser power of the laser beam source 5 in order to write the signal on the disc 2, or to control laser power based on an RF signal. The synchronization detector & A/D converter 10 creates clocks based on a synchronized signal recorded on the optical disc 2 at a predetermined interval, and converts an analog signal to a digital signal. The signal modulator, demodulator & ECC part 11 modulates and demodulates signals, adds ECCs, and performs an error correcting process based on ECCs. The buffer memory 12 temporarily stores data when the data is processed by the signal modulator, demodulator & ECC part 11. The video sound processing part 13 performs a necessary video process and a sound process to output video and sounds in analog forms through the D/A converter 14. The interface 18 is an interface to connect an external computer and a video sound source, not shown.

Figure 2:
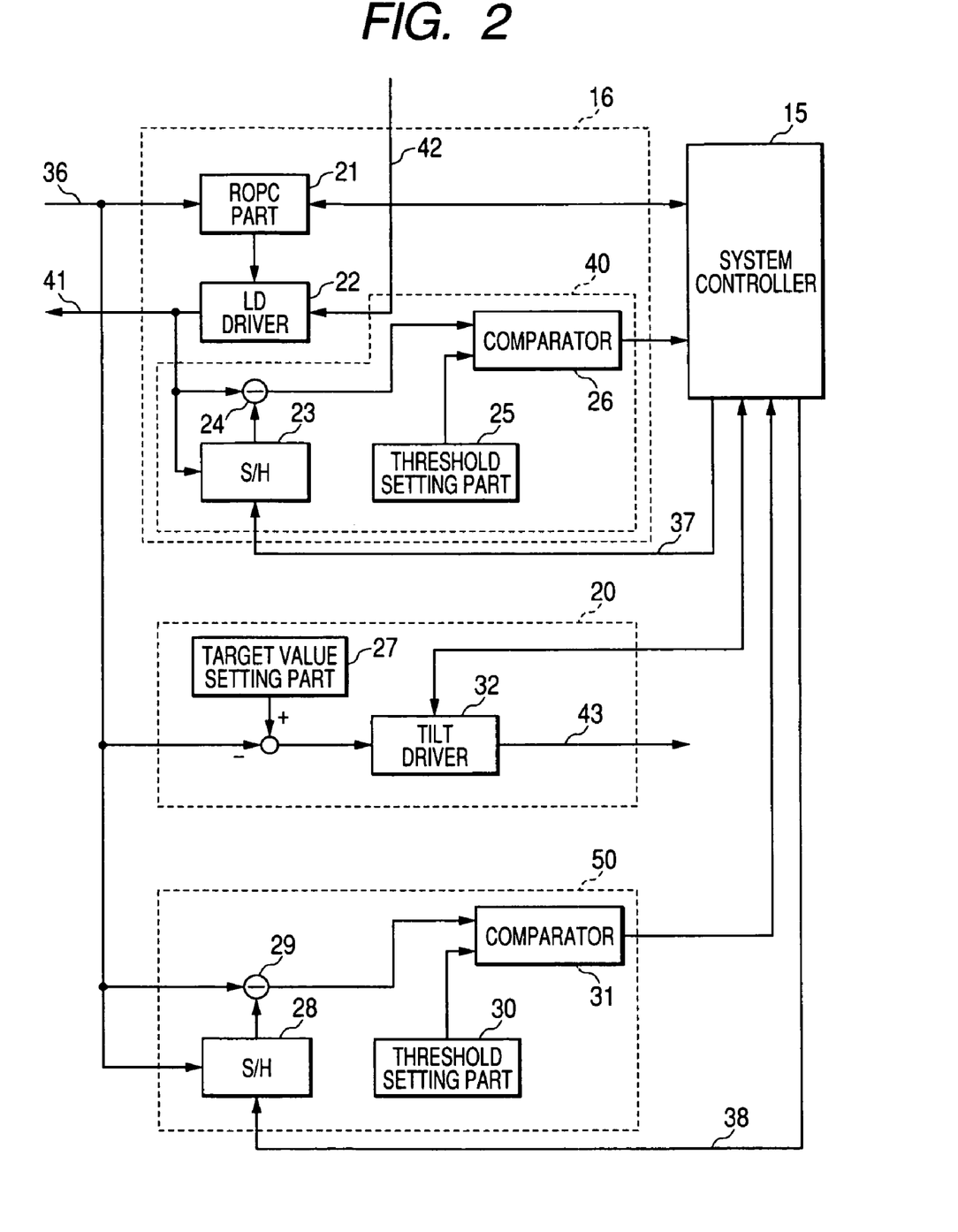
FIG. 2 shows a block diagram depicting the configuration of a laser control part and a tilt control part.

FIG. 2 shows a block diagram depicting the configurations of the laser control part 16 and a tilt control part and an RF signal level variation acquiring part included in the servo control part 17 shown in FIG. 1.

The laser control part 16 has an ROPC part 21, an LD driver 22, and a laser power variation acquiring part 40. The laser power variation acquiring part 40 has a sample hold (S/H) circuit 23, a subtractor 24, a threshold setting part 25, and a comparator 26.

The LD driver 22 outputs a drive signal 41 to drive the laser beam source 5. The ROPC part 21 receives an RF signal 36 which is a signal of the reflecting light in recording, controls the drive of the LD driver 22 based thereon, and controls laser power in order to prevent a detrimental effect because of irregularities in the recording film of the disc 2.

For the ROPC part 21, a general ROPC system can be used. More specifically, the ROPC part 21 compares the level of the reflecting light from a pit at the optimum recording power in OPC (in calibration prior to signal recording) with the level of the reflecting light from the pit in signal recording. Then, based on the compared result, it executes a recording process while it is correcting optimum recording power determined in OPC whenever necessary. Alternatively, the ROPC part 21 may store a table expressing the relationship between the RF signal level and laser power for processing based on the table. For the process executed by the ROPC part 21, various image processing methods can be considered in addition to this.

The laser power variation acquiring part 40 monitors the variation in the recording level of laser power, for example, and acquires the variation. More specifically, the S/H circuit 23 receives the signal 41 at the level of laser power outputted from the ROPC part 21, and holds the laser power 41 in response to a timing signal 37 outputted from the system controller 15. The subtractor 24 computes a difference between the held laser power and the laser power currently outputted, and outputs the difference to the comparator 26. The comparator 26 compares the inputted differential signal with a threshold freely set at the threshold setting part 25, binarizes the compared result, for example, and outputs it to the system controller 15.

A tilt control part 20 has a tilt driver 32, and a target value setting part 27. An RF signal level variation acquiring part 50 has a S/H circuit 28, a subtractor 29, a threshold setting part 30, and a comparator 31.

The tilt driver 32 receives an error signal between the RF signal 36 and a target value set at the target value setting part 27 as the RF signal 36 outputted from the RF amplifier 9 is used as the amount to be controlled. Then, the tilt driver 32 outputs a drive signal 43 to the three-axis actuator 7 so that the error signal is turned to zero. The RF signal level variation acquiring part 50 monitors the RF signal level outputted from the RF amplifier 9, and acquires the variation. More specifically, the S/H circuit 28 receives the RF signal 36 outputted from the RF amplifier 9, and holds the RF signal 36 in response to a timing signal 38 outputted from the system controller 15. The subtractor 24 computes a difference between the held RF signal and the RF signal currently outputted, and outputs the difference to the comparator 31. The comparator 31 compares the inputted differential signal with a threshold freely set at the threshold setting part 30, binarizes the compared result, for example, and outputs it to the system controller 15.

Figure 3:
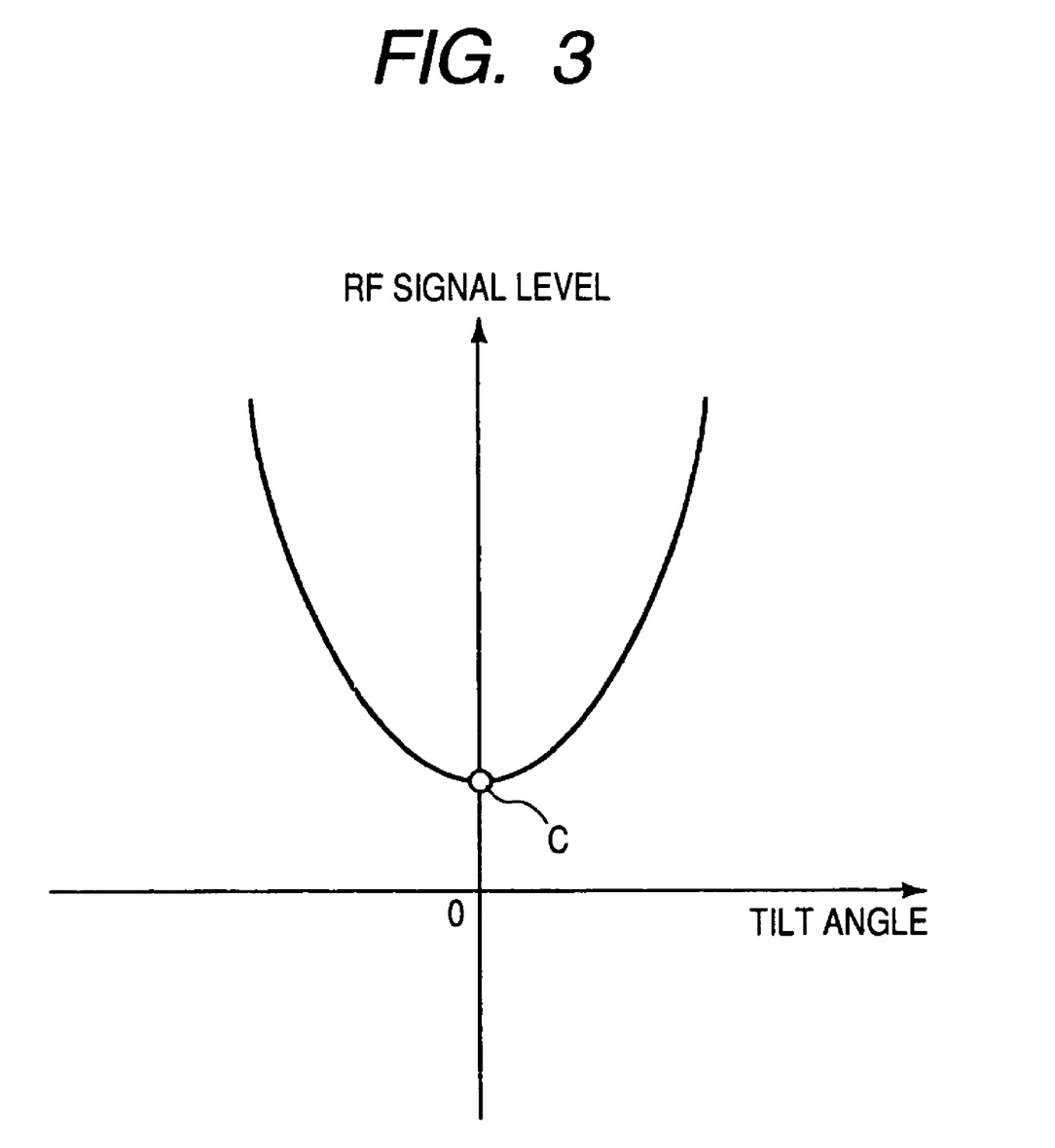
FIG. 3 shows a graph depicting the relationship between the tilt angle controlled by the tilt control part and the RF signal level in signal recording.

FIG. 3 shows a graph depicting the relationship between the tilt angle controlled at the tilt control part 20 and the RF signal level in signal recording. The target value of the tilt angle is almost zero. For example, the target value set at the target value setting part 27 is the RF signal level (point C) corresponding to the tilt angle of zero. It is needless to say that the tilt angle is a relative angle between the recording surface of the disc 2 and the objective lens 3. When the tilt angle is zero, the optical axis of the laser beam between the objective lens 3 and the disc 2 is vertical with respect to the recording surface. When laser power is constant, the depth of the pit formed in the disc 2 is shallower as the tilt angle is greater in recording, and the light quantity of the reflected and reflecting light is greater. Thus, the RF signal level becomes great. Accordingly, the relationship is as depicted in the graph shown in FIG. 3.

In addition, in the signal playback process, the relationship is a graph that the graph shown in FIG. 3 is reversed as the horizontal direction is used as the axis. This is because a shift of the reflected and reflecting light becomes greater as the tilt angle is greater, and in association with this, the received light quantity at the optical pickup 6 becomes small.

Figure 4:
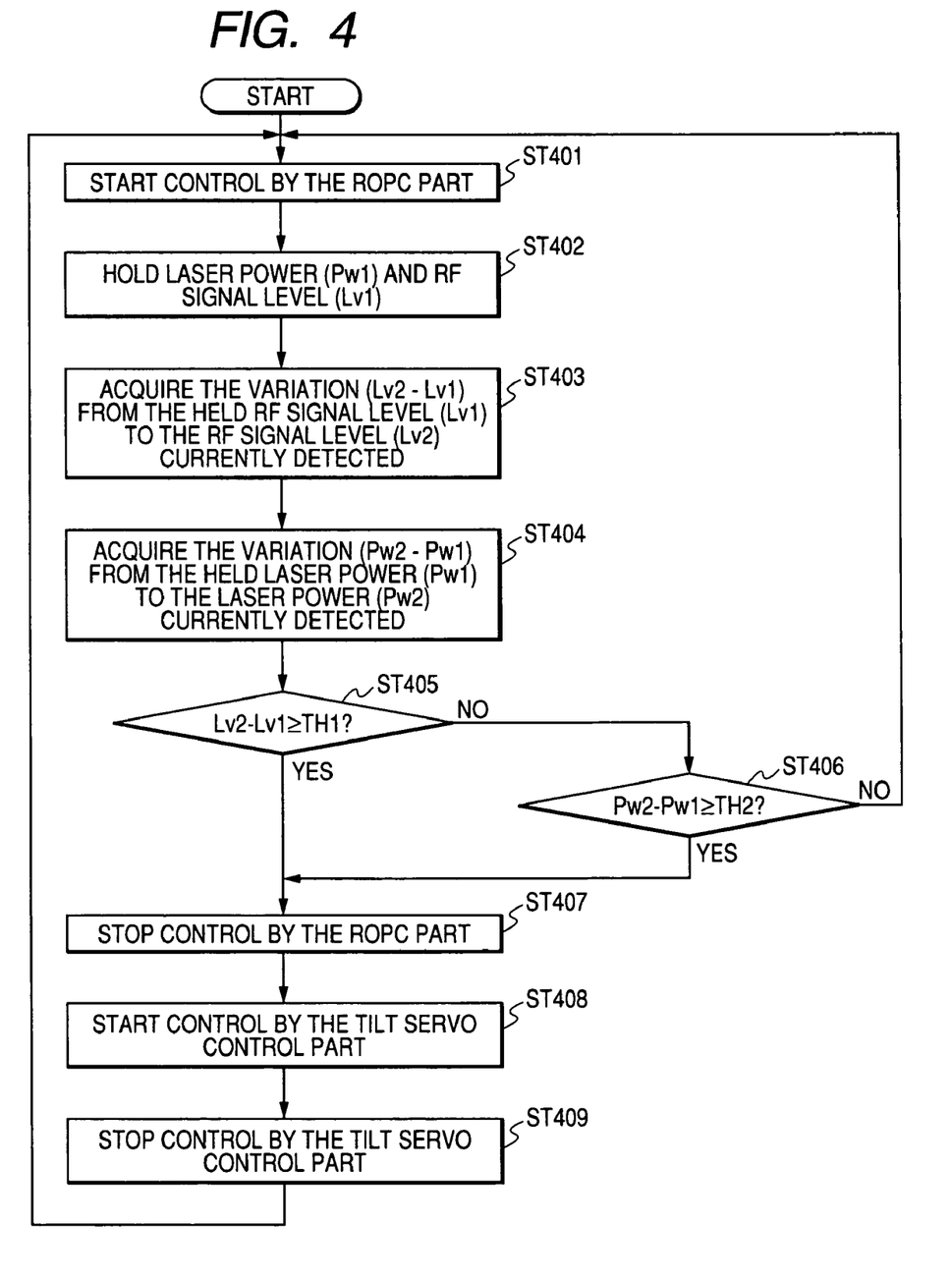
FIG. 4 shows a flow chart depicting the operation of a recording process in the optical disc apparatus.
Figure 5A:
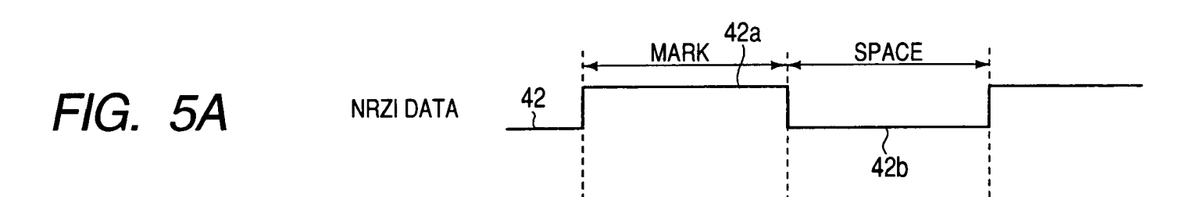
FIGS. 5A to 5C show diagrams depicting various signals in recording according to an embodiment.
Figure 5B:
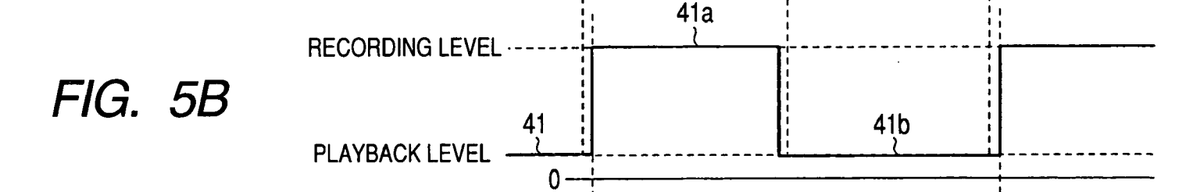
Figure 5C:
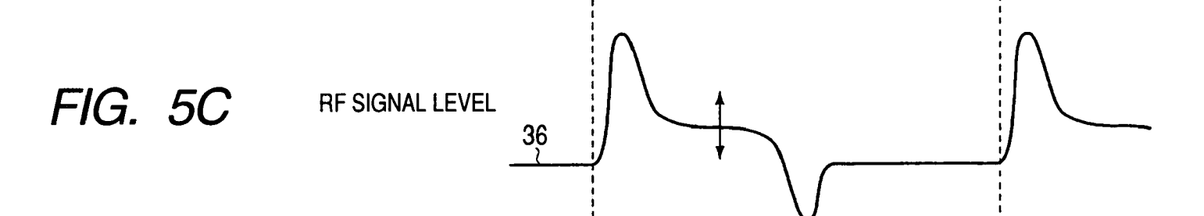

Next, the operation of the recording process in the optical disc apparatus 100 will be described. FIG. 4 shows a flowchart depicting the operation. FIG. 5A shows a modulated signal created at the signal modulator, demodulator & ECC part 11 in the recording process, and FIG. 5B shows a drive signal of the LD driver 22 in the recording process. In addition, FIG. 5C shows the waveform of the RF signal of the reflected and reflecting light when a signal is recorded by the drive signal. In FIG. 5A, the modulated signal is depicted in the NRZI (Non Return to Zero Inverted) mode, but this is merely an example. For example, it may be the NRZ mode, or may be the combination of these with RLL (Run Length Limited) mode, or modes such as 8/16 modulation.

As shown in FIG. 5B, for the RF signal, when the laser power is first applied to the disc 2 at the recording level, pits are started to form. When pits are started to form, the intensity of the reflecting light is varied by the pits in turn being formed. Thus, the level of the RF signal 36 suddenly drops. More specifically, the initial state is a high reflectance state in which no pits are formed in a recording layer, and the pits are started to form to reduce the reflectance even though the recording power is constant. When the recording film of the disc 2 has irregularities, the signal wanders up and down, as shown in an arrow on the RF signal 36 shown in FIG. 5C. When the laser power and the tilt angle are controlled at the same time, it is difficult to tell that the fluctuations are caused by fluctuations in the tilt angle or caused by irregularities in the recording film, or caused by both. Then, the optical disc apparatus 100 is operated as described below.

First, while the ROPC part 21 controls laser power based on the RF signal 36 (Step 401), the LD driver 22 modulates laser power based on the modulated signal, and thus the recording process is executed. At this time, the tilt control part 20 does not perform tilt control. When the system controller 15 outputs a sampling pulse 37 at a given timing, for example, the S/H circuit 23 of the laser power variation acquiring part 40 holds a laser power signal 41$a$ (Pw1) in recording outputted from the LD driver 22 (Step 402). In addition, when the system controller 15 outputs a sampling pulse 38 at a given timing, the S/H circuit 28 of the RF signal level variation acquiring part 50 holds an RF signal 36 (Lv1) (Step 402).

It is fine that the sampling pulses 37 and 38 are outputted when the laser power 41 is at the recording level 41$a$, for example, that is, they are outputted within a mark section 42$a$ of a modulated signal 42. However, not necessarily in the mark section 42$a$, they may be outputted when the laser power 41 is at a playback level 41$b$, that is, the sampling pulses 37 and 38 may be outputted within the space section 42$b$ of the modulated signal 42.

In the RF signal level variation acquiring part 50, the RF signal 36 is held, after a predetermined time period, the S/H circuit 28 outputs the held RF signal level (Lv1) to the subtractor 29, and the difference is taken between it and the RF signal level (Lv2) currently inputted to the subtractor 29. More specifically, a variation (Lv2−Lv1) is acquired (Step 403). Similarly, in the laser power variation acquiring part 40, the laser power 41 is held, after a predetermined time period, the S/H circuit 23 outputs the held laser power (Pw1) to the subtractor 24, and the difference is taken between it and the laser power (Pw2) currently inputted to the subtractor 24. More specifically, the variation (Pw2−Pw1) is acquired (Step 404). A predetermined time period can be set freely. Any orders of doing Step 403 and Step 404 are fine, or these steps may be done at the same time.

When this is done, the comparator 31 compares the variation with a threshold TH1. When Lv2−Lv1≧TH1 (YES at Step 405), the comparator 31 outputs a H-logic signal to the system controller 15. Based on this, the system controller 15 outputs a stop signal to the ROPC part 21 to stop laser power control, whereas it outputs a start signal to the tilt driver 32 to start tilt control. More specifically, laser power control is switched to tilt control. Thus, the ROPC part 21 stops control (Step 407), and the tilt driver 32 start tilt control (Step 408). When the ROPC part 21 stops control, the LD driver 22 does not receive the control signal from the ROPC part 21, that is, the laser power is not finely controlled, and the recording process is continued based only on the modulated signal.

The comparator 31 of the RF signal level variation acquiring part 50 determines that there is no abnormality when the level is not Lv2−Lv1≧TH1 (NO at Step 405), and outputs a L-logic signal to the system controller 15. On the other hand, the comparator 26 compares the variation (Pw2−Pw1) with the threshold. When the power is Pw2−Pw1≧TH2 (YES at Step 406), it outputs a H-logic signal to the system controller 15. When the system controller 15 thus receives the H-logic signal from the comparator 31 and also receives the L-logic signal from the comparator 26, as similar to the description above, the process goes to Step 407 and to steps after that. On the other hand, when the system controller 15 receives the L-logic signals from the comparators 26 and 31 (NO at Step 405 and NO at Step 406), the process returns to Step 401, and control is continued by the ROPC part 21 with no change.

In the tilt control at Step 408, the tilt driver 32 outputs a drive signal to the three-axis actuator 7 based on the RF signal 36 so that the tilt angle is nearly zero. For example, it is fine for the tilt driver 32 to do feedback as the RF signal is the amount to be controlled at the timing when the sampling pulse is inputted within the mark section 42$a$ or within the space section 42$b$ of the modulated signal from the system controller 15. Thus, the RF signal level is monitored at the position at which the RF signal is stable as much as possible, whereby an appropriate RF signal level can be obtained, and tilt control can be performed highly accurately.

For the timing to stop tilt control (Step 409), this time period can be considered that the tilt servo is started to the time after a predetermined time period, for example. Alternatively, this scheme may be done in which the laser power 41 or the RF signal 36 in recording is kept monitoring in the midway of tilt control, and tilt control is stopped when the RF signal level variation or laser power variation in recording is smaller than the threshold. At this time, of course, control done by the ROPC part 21 is being stopped. When the system controller 15 stops tilt control, the process returns to Step 401, and control is switched to laser power control by the ROPC part 21.

Figure 6A:
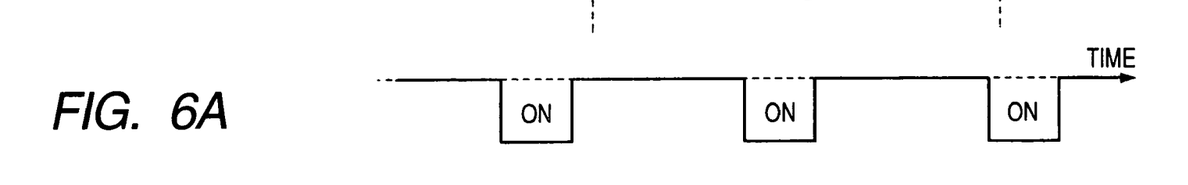
FIGS. 6A and 6B show diagrams depicting the timing to switch between tilt control and laser power control.
Figure 6B:
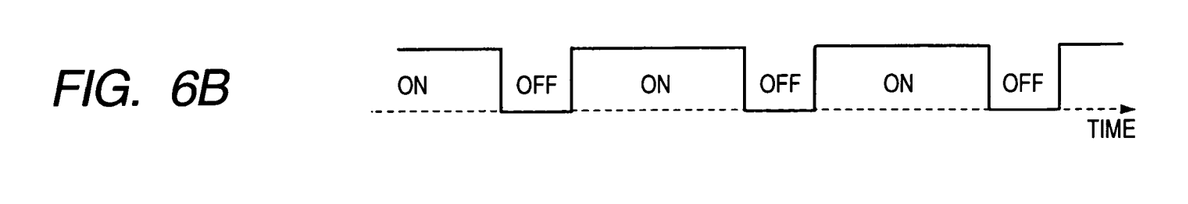

As described above, in the embodiment, as shown in FIGS. 6A and 6B, the recording process is executed as tilt control (FIG. 6A) and laser power control (FIG. 6B) are switched alternately. Therefore, for example, since laser power control is stopped while tilt control is being performed, laser power is constant. From the viewpoint of performing tilt control, the level of the reflecting light from the disc 2 is detected in an appropriate manner, and recording quality can be prevented from being deteriorated.

In the embodiment, when the variation in the RF signal level (Lv2−Lv1) is normal at Step 405, that is, the level is Lv2−Lv1<TH1 and the level is abnormal, control is switched to tilt control without determination whether the variation in the laser power (Pw2−Pw1) is abnormal, and thus the process is simplified.

FIGS. 7A to 7D show diagrams depicting various signals in recording according to another embodiment of the invention. In the description below, the same function and operation of an optical disc apparatus 100 according to the embodiment are simplified or omitted for description, and different points will be mainly described.

Figure 7A:
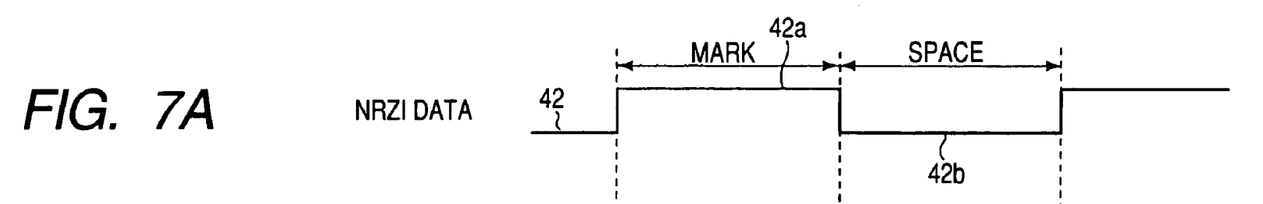
FIGS. 7A to 7D show diagrams depicting various signals in recording according to another embodiment of the invention.
Figure 7B:
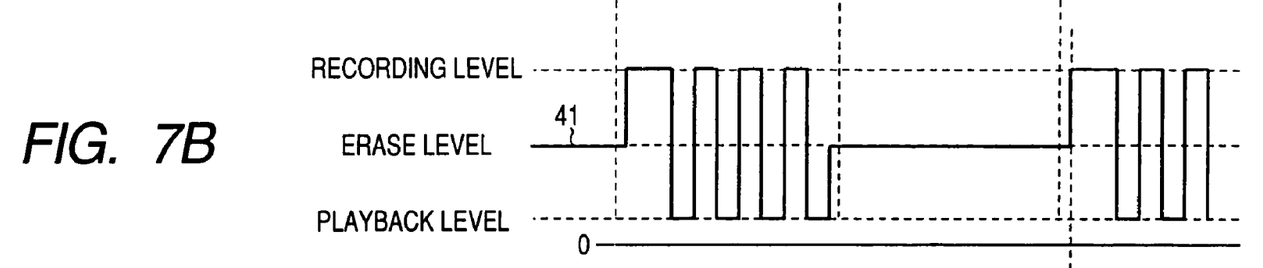
Figure 7C:
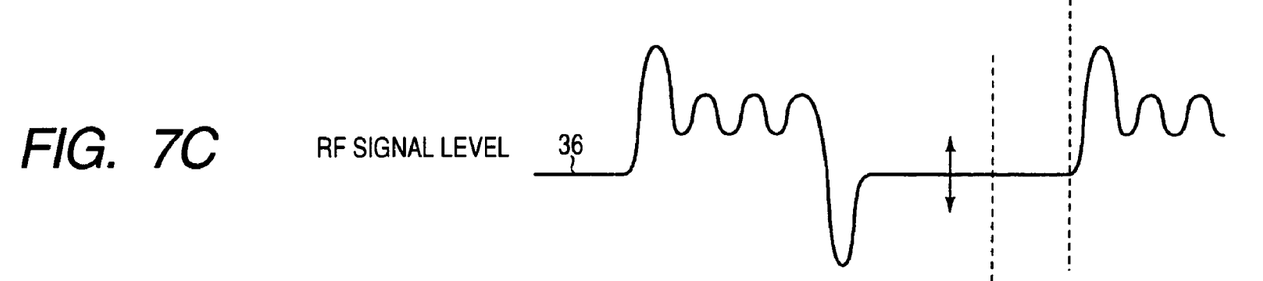

In the embodiment, as shown in FIG. 7B, for example, laser power is processed for recording under control of three values including an erase level. In addition, the multi-pulse mode is used. As described above, when the multi-pulse mode is used, for example, in the tilt control at Step 408 shown in FIG. 4, the system controller 15 outputs a sampling pulse a to a tilt driver 32 when the modulated signal is in the space section, that is, in an erase process (see FIG. 7D). Thus, a stable, appropriate RF signal level can be detected more than the case in which the level is sampled in the mark section of multiple pulses. Therefore, highly accurate tilt control is possible. In addition, in the embodiment, the timing to sample the RF signal level can be set freely as the amount to be controlled in the ROPC part 21, but also in this case, sampling may be done within the space section 42b.

In the tilt control in the embodiment, for example, the system controller 15 determines whether the erase section length is longer than a threshold. When it is determined that the erase section length is equal to greater than the threshold, the RF signal may be sampled within the erase section. In the DVD standards, the mode is the 8/16 +NRZI modulation mode, and the signal length, or the erase section length is 3 T to 11 T (T is a clock cycle). In the case of the normal recording speed (recording at the normal speed), it is fine that the threshold for the erase section length is any one of 7 T to 1 T, for example. More specifically, the erase section as long as possible is selected to detect a more stable, appropriate RF signal level.

Alternatively, when the recording process is performed at double speed, not at the normal recording speed, the system controller 15 may properly change the threshold of the erase section length in accordance with the recording speed. When the recording speed becomes faster, the erase section length becomes shorter. Thus, the threshold is changed to detect a stable, appropriate RF signal level all the time. For example, the threshold can be changed freely in such a way that the threshold is 8 T and 9 T at double speed, and 10 T or greater at quadruple speed, 8× speed and so on.

The selection process for the erase section based on the threshold described above may be adapted to tilt control in the single pulse mode as shown in FIGS. 5A to 5C.

Figure 8:
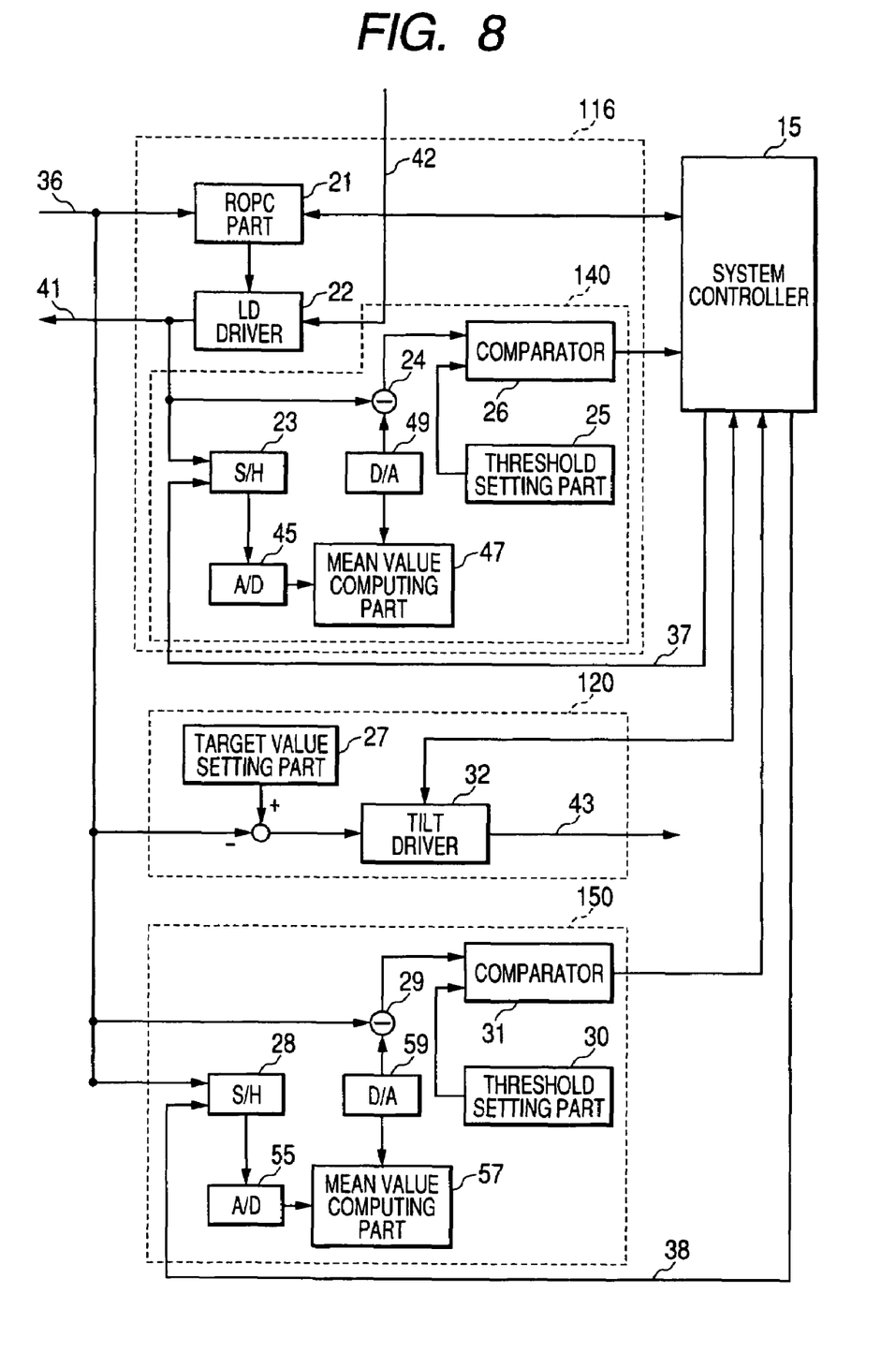
FIG. 8 shows a block diagram depicting the configuration of a laser control part and a tilt control part according to still another embodiment of the invention.

FIG. 8 shows a block diagram depicting the configurations of a laser control part, a tilt control part and an RF signal level variation acquiring part according to still another embodiment of the invention. In the embodiment, as compared with the form shown in FIG. 2, the configurations of a laser power variation acquiring part 140 and an RF signal level variation acquiring part 150 are different.

The laser power variation acquiring part 140 of a laser control part 116 has a mean value computing part 47 which computes the mean value of laser power sampled at a S/H circuit 23 in a multiple number of times, for example. More specifically, laser power 41 sampled at the S/H circuit 23 in a multiple number of times is digitally converted by an A/D converter 45. A mean value computing part 47 takes in the digital data, computes a mean value, and outputs the mean value to a D/A converter 49. The D/A converter 49 converts the mean value in an analog manner, and outputs it to a subtractor 24. The subtractor 24 outputs a differential signal between the current laser power 41 by an LD driver 22 and the mean value to a comparator 26.

Similarly, also in the RF signal level variation acquiring part 150, an A/D converter 55 digitally converts an RF signal level 36 sampled in a multiple number of times at a S/H circuit 28. A mean value computing part 57 takes in the digital data, computes a mean value, and outputs the mean value to a D/A converter 59. The D/A converter 59 converts the mean value in an analog manner, and outputs it to a subtractor 29. The subtractor 29 outputs a differential signal between the current RF signal level of 36 and the mean value to a comparator 31.

With the configurations of the laser power variation acquiring part 140 and the RF signal level variation acquiring part 150, laser power control and tilt control can be switched as well.

The invention is not limited to the embodiments described above, which can be modified variously.

For example, in the graph shown in FIG. 3, in the initial stage of the tilt control operation, it is unknown whether the tilt angle corresponding to a certain RF signal level is positive or negative, that is, the slope direction is unknown. Then, for example, prior to the signal recording process, it is possible to check the slope direction caused by the warpage or deformation of a disc. In this case, it is fine that the optical disc apparatus 100 is operated as described below. First, while a disc 2 is being rotated on the outer radius side of the disc, the RF signal level is acquired for a predetermined period or a predetermined number of times, and the maximum value of the tilt angle is stored. Subsequently, while the disc is being rotated on the inner radius side of the disc, the RF signal level is acquired for a predetermined period or a predetermined number of times, and the maximum value of the tilt angle is stored. The stored maximum values of the disc on the outer and inner radius sides are compared to tell in which direction the slope of the disc is oriented.

As described above, it may be fine to do measurements at two points between the outer radius side and the inner radius side, or may be at three points among the outer radius side, the center and the inner radius side, or may be four points or greater. Based on measurement information, an interpolation line or curve of radial position information and the slope of the disc 2 may be created. Then, when tilt control is performed based on the stored items of information, the tilt angle direction is known from the initial stage of tilt control, and thus tilt control can be facilitated. In addition, in this case, the amount to be controlled is not necessarily the RF signal, and it may be a tracking error signal.

The variation in the RF signal level at Step 403 shown in FIG. 4 is the differential signal, but instead of this, it may be the variation that a value is differentiated within a predetermined period.

In the embodiment shown in FIGS. 5A to 5C, the laser power is a binary value of the recording level and the playback level. However, it is not limited thereto, and control may be done by a ternary value including the erase level.

Figure 7D:
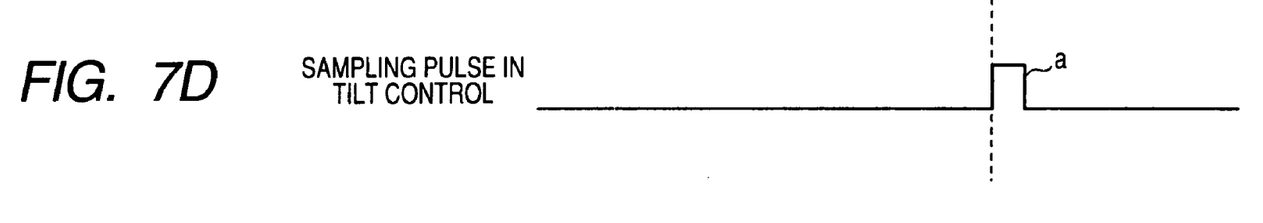

In FIG. 7D, the embodiment is described in which the sampling pulse a in tilt control is generated within the space section. However, it is not necessarily in the erase process. The sampling pulse may be generated within the mark section.

It should be understood by those skilled in the art that various modifications combinations, sub-combinations and alterations may occur depending on design requirements and other factors insofar as they are within the scope of the appended claims or the equivalents thereof.

What is claimed is:

1. An optical disc drive apparatus comprising:
    a laser beam source;
    a collector device which is disposed as it faces a disc that can record a signal and which collects a laser beam emitted from the laser beam source onto the disc;
    a record processing module which records the signal on the disc through the collector device while it is modulating laser power of the laser beam source;
    a reflecting light level detecting module which receives the reflecting light when the signal is recorded and which detects a level of the reflecting light;
    a laser power control module which controls the laser power when the signal is recorded based on the detected level of the reflecting light;
    a tilt control module which controls a tilt angle between the disc and the collector device based on the detected level of the reflecting light;
    a switching module which switches between control of the laser power and control of the tilt angle, wherein the second acquiring module includes a first computing module which computes a mean value of the laser power within a predetermined period, and a second computing module which computes a difference between the computed mean value and the detected laser power after the predetermined period as the second variation and wherein the switching module includes a first acquiring module which acquires a first variation that is a variation in the detected level of the reflecting light, a first control module which stops control done by the laser power control module and starts control done by the tilt control module when the first variation is equal to or greater than a first threshold, a second acquiring module which acquires a second variation that is a variation in the laser power, and a second control module which stops control done by the laser power control module and starts control done by the tilt control module when the first variation is below the threshold and the second variation is equal to or greater than a second threshold.

2. An optical disc drive apparatus comprising:

a laser beam source;

a collector device which is disposed as it faces a disc that can record a signal and which collects a laser beam emitted from the laser beam source onto the disc;

a record processing module which records the signal on the disc through the collector device while it is modulating laser power of the laser beam source;

a reflecting light level detecting module which receives the reflecting light when the signal is recorded and which detects a level of the reflecting light;

a laser power control module which controls the laser power when the signal is recorded based on the detected level of the reflecting light;

a tilt control module which controls a tilt angle between the disc and the collector device based on the detected level of the reflecting light; and a switching module which switches between control of the laser power and control of the tilt angle, wherein the record processing module includes a determination module which determines whether an erase section length for recording at an erase level is equal to or greater than a threshold, and the tilt control module performs control within an erase section equal to or greater than the threshold when the determination module determines that the erase section length is equal to or greater than the threshold.

3. An optical disc drive apparatus comprising:

a laser beam source;

a collector device which is disposed as it faces a disc that can record a signal and which collects a laser beam emitted from the laser beam source onto the disc;

a record processing module which records the signal on the disc through the collector device while it is modulating laser power of the laser beam source;

a reflecting light level detecting module which receives the reflecting light when the signal is recorded and which detects a level of the reflecting light;

a laser power control module which controls the laser power when the signal is recorded based on the detected level of the reflecting light;

a tilt control module which controls a tilt angle between the disc and the collector device based on the detected level of the reflecting light; and a switching module which switches between control of the laser power and control of the tilt angle, wherein the record processing module includes a determination module which determines whether a playback level section length for recording at a playback level is equal to or greater than a threshold, and the tilt control module performs control within a playback level section equal to or greater than the threshold when the determination module determines that the playback level section length is equal to or greater than the threshold.

4. The optical disc drive apparatus according to claim 2 or 3, wherein the record processing module includes a first modifying module which changes recording speed; and the tilt control module has a second modifying module which changes the threshold in response to a factor of recording speed to be changed.

5. A signal recording method comprising the steps of:

collecting a laser beam emitted from a laser beam source through a collector device which is disposed as it faces a disc that can record a signal and recording the signal on the disc while laser power of the laser beam source is being modulated;

receiving the reflecting light when the signal is recorded and detecting a level of the reflecting light;

controlling the laser power when the signal is recorded based on the detected level of the reflecting light;

controlling a tilt angle between the disc and the collector device based on the detected level of the reflecting light; and switching between control of the laser power and control of the tilt angle, wherein the switching step includes acquiring a first variation that is a variation in the detected level of the reflecting light, and stopping the controlling the laser power step and starting the controlling the tilt angle step when the first variation is equal to or greater than a first threshold, said switching step includes acquiring a second variation that is a variation in the laser power, and stopping said controlling the laser power step and starting the controlling a tilt angle step when the first variation is below the threshold and the second variation is equal to or greater than a second threshold, said step of acquiring a second variation includes computing a mean value of the laser power within a predetermined period and computing a difference between the computed mean value and the detected laser power after the predetermined period as the second variation.

* * * * *